US012539739B2

(12) United States Patent
Kim et al.

(10) Patent No.: US 12,539,739 B2
(45) Date of Patent: Feb. 3, 2026

(54) REFRIGERANT CIRCULATING APPARATUS OF VEHICLE

(71) Applicants: HYUNDAI MOTOR COMPANY, Seoul (KR); KIA CORPORATION, Seoul (KR); HANON SYSTEMS, Daejeon (KR); DOOWON CLIMATE CONTROL CO., LTD., Asan-si (KR)

(72) Inventors: Jeawan Kim, Hwaseong-si (KR); Dongwook Lee, Hwaseong-si (KR); Wan Je Cho, Hwaseong-si (KR); Yeonho Kim, Seoul (KR); Hoyoung Jeong, Hwaseong-si (KR); Man Hee Park, Suwon-si (KR); Yeong Jun Kim, Incheon (KR); Jae Yeon Kim, Hwaseong-si (KR); Hochan An, Hwaseong-si (KR); Hae Jun Lee, Daedeok-gu (KR); Sang Gu Woo, Daedeok-gu (KR); Moo Joong Kim, Daedeok-gu (KR); Won Suk Lee, Cheonan-si (KR); Soon-Jong Lee, Yesan-gun (KR); Tae Min Park, Asan-si (KR)

(73) Assignees: Hyundai Motor Company, Seoul (KR); Kia Corporation, Seoul (KR); Hanon Systems, Daejeon (KR); Doowon Climate Control Co., Ltd., Asan-si (KR)

( * ) Notice: Subject to any disclaimer, the term of this patent is extended or adjusted under 35 U.S.C. 154(b) by 162 days.

(21) Appl. No.: 18/381,872

(22) Filed: Oct. 19, 2023

(65) Prior Publication Data
US 2024/0416727 A1 Dec. 19, 2024

(30) Foreign Application Priority Data
Jun. 16, 2023 (KR) .......................... 10-2023-0077172

(51) Int. Cl.
*B60H 1/32* (2006.01)
*B60H 1/00* (2006.01)

(52) U.S. Cl.
CPC ....... *B60H 1/3229* (2013.01); *B60H 1/00571* (2013.01); *B60H 1/3223* (2013.01)

(58) Field of Classification Search
CPC .............. B60H 1/3229; B60H 1/00571; B60H 1/3223; B60H 1/00485; B60H 1/00357;
(Continued)

(56) References Cited

U.S. PATENT DOCUMENTS

2019/0039440 A1 2/2019 Calderone
2022/0194167 A1* 6/2022 Morimoto .......... B60H 1/00571
(Continued)

FOREIGN PATENT DOCUMENTS

CN 213778220 U * 7/2021

*Primary Examiner* — Kun Kai Ma
(74) *Attorney, Agent, or Firm* — Fish & Richardson P.C.

(57) ABSTRACT

A refrigerant circulating apparatus of a vehicle includes a compressor configured to compress a refrigerant, at least one heat-exchanger configured to heat-exchange the refrigerant, at least one valve configured to selectively flow the refrigerant to the at least one heat-exchanger, and a refrigerant fluid line unit mounted with the compressor, the at least one heat-exchanger, and the at least one valve, and interiorly formed with a plurality of fluid lines to flow the refrigerant to the compressor and the at least one heat-exchanger by a selective operation of the at least one valve, where the refrigerant fluid line unit includes a first fluid line mounting plate and a second fluid line mounting plate coupled to each other.

20 Claims, 7 Drawing Sheets

(58) Field of Classification Search
CPC ..... B60H 1/323; B60H 1/00899; F25B 41/20; F25B 41/31; F25B 43/00; F25B 2400/13; B60Y 2304/01; B60Y 2304/072
See application file for complete search history.

(56) References Cited

U.S. PATENT DOCUMENTS

| | | | |
|---|---|---|---|
| 2022/0332162 A1* | 10/2022 | Lee | B60H 1/00278 |
| 2024/0167769 A1* | 5/2024 | Rhee | B60K 11/02 |
| 2024/0181846 A1* | 6/2024 | Lee | B60H 1/32284 |

* cited by examiner

REFRIGERANT CIRCULATING APPARATUS OF VEHICLE

CROSS-REFERENCE TO RELATED APPLICATION

This application claims priority to and the benefit of Korean Patent Application No. 10-2023-0077172, filed in the Korean Intellectual Property Office, on Jun. 16, 2023, the entire contents of which are incorporated herein by reference.

TECHNICAL FIELD

The present disclosure relates to a refrigerant circulating apparatus of a vehicle, and more particularly, to a refrigerant circulating apparatus of a vehicle, which is included in an air conditioning system applied for cooling and heating of the vehicle interior of a purpose-built vehicle (PVB), and capable of minimizing use of piping while improving mountability of each constituent element.

BACKGROUND

The vehicle industry has been introducing a new concept of future mobility vision for realizing a human-centered and dynamic future city.

One of these future mobility solutions is a purpose-built vehicle (PBV) as purpose-based mobility.

The PBV indicates an eco-friendly mobility solution that provides customized services for occupants while they travel to their destination on the ground, and may set optimal paths for each situation and perform platooning using electric vehicle-based artificial intelligence.

For instance, the PBV may be a means of transportation and a fixed facility with case-related techniques, and a separate driver seat may be unnecessary as it has an autonomous driving function. In addition, an indoor space thereof may have expandability.

In some cases, a PBV may perform a role of a shuttle that moves a large number of people, and may also be changed to a recreational space such as a restaurant, a cafe, a hotel, and a movie theater, and an essential facility such as a hospital and a pharmacy.

In some cases, the PBV may be powered by an electric motor, and may include a skateboard-like rolling chassis (referred to as an underbody or skateboard in the art) with batteries spreading on a lower portion thereof and an upper body where occupants can board.

In some cases, where the PBV includes an air conditioning system for controlling the indoor temperature of the upper body, it may be difficult to position components included in a refrigerant circulating apparatus of the air conditioning system in a narrow mounting space, and a layout of pipes through which a refrigerant flows may become complicated.

In addition, some components of the refrigerant circulating apparatus may be mounted on the upper body due to limitation of the mounting space of the rolling chassis, and thus an internal space of the upper body is reduced.

A technique for mounting on a rolling chassis may simplify piping of the refrigerant circulating apparatus and promote modularization.

SUMMARY

The present disclosure has been made in an effort to provide a refrigerant circulating apparatus of a vehicle, which is included in an air conditioning system applied for cooling and heating of the vehicle interior of a purpose-built vehicle (PVB), and capable of minimizing use of piping while improving mountability of each constituent element.

According to one aspect of the subject matter described in this application, a refrigerant circulating apparatus of a vehicle includes a compressor configured to compress a refrigerant, at least one heat-exchanger configured to exchange heat with the refrigerant, at least one valve configured to selectively provide the refrigerant to the at least one heat-exchanger, and a refrigerant fluid line unit disposed adjacent to the compressor, the at least one heat-exchanger, and the at least one valve. The refrigerant fluid line unit includes (i) a plurality of fluid lines that are defined inside the refrigerant fluid line unit and configured to provide the refrigerant to the compressor and the at least one heat-exchanger based on a selective operation of the at least one valve, (ii) a first fluid line mounting plate, and (iii) a second fluid line mounting plate coupled to the first fluid line mounting plate.

Implementations according to this aspect can include one or more of the following features. For example, the first fluid line mounting plate includes (i) a first bracket that supports the compressor and (ii) a first fluid line plate portion that is curved from the first bracket and is coupled to the second fluid line mounting plate. In some examples, the first fluid line mounting plate can have an L-shape, where the first fluid line plate portion is disposed perpendicular to the first bracket.

In some implementations, the first fluid line plate portion can define (i) a plurality of first penetration holes configured to supply the refrigerant to the compressor and to receive the refrigerant from the compressor, and (ii) a plurality of first grooves defined at an inner surface of the first fluid line plate portion and connected to one or more of the plurality of first penetration holes, the inner surface of the first fluid line plate portion facing the second fluid line mounting plate. In some examples, the second fluid line mounting plate can include a second bracket and a second fluid line plate portion that is curved from the second bracket and is coupled to the first fluid line plate portion, where the at least one heat-exchanger and the at least one valve are disposed at an outer surface of the second fluid line plate portion.

In some examples, the second fluid line mounting plate can have an L-shape, where the second fluid line plate portion is disposed perpendicular to the second bracket. In some examples, the second fluid line plate portion can define (i) a plurality of second penetration holes configured to communicate with the at least one heat-exchanger and the at least one valve and (ii) a plurality of second grooves defined at an inner surface of the second fluid line plate portion and connected to one or more of the plurality of second penetration holes, where the inner surface of the second fluid line plate portion faces the first fluid line plate portion.

In some examples, shapes of the plurality of first grooves are identical to shapes of the plurality of second grooves, respectively. In some examples, the plurality of first grooves are coupled to the plurality of second grooves, respectively, to thereby define the plurality of fluid lines in a state in which the first fluid line plate portion and the second fluid line plate portion are coupled to each other.

In some implementations, the refrigerant circulation apparatus can include at least one bush unit disposed at least one of the first bracket or the second bracket and configured to reduce transmission of vibration generated from the compressor, the at least one heat-exchanger, or the at least one valve. In some examples, the at least one bush unit can include an insulator coupled to the first bracket or the second bracket and a stud bolt coupled to in a center of the insulator. In some implementations, the first bracket defines at least one first open hole, and the second bracket defines at least one second open hole.

In some implementations, the at least one heat-exchanger is configured to configured to exchange heat between a coolant and the refrigerant in the plurality of fluid lines to thereby condensate or evaporate the refrigerant. In some examples, the at least one heat-exchanger includes (i) a first heat-exchanger configured to condensate or evaporate the refrigerant supplied through the plurality of fluid lines, (ii) a second heat-exchanger configured to condensate or evaporate the refrigerant supplied through the plurality of fluid lines from the compressor or the first heat-exchanger, and (iii) a third heat-exchanger configured to condensate or evaporate the refrigerant supplied through the plurality of fluid lines from the compressor or the first heat-exchanger.

In some examples, the at least one valve includes a first valve and a second valve that are connected to the compressor and to the first to third heat-exchangers via the plurality of fluid lines, where the first valve and the second valve are configured to selectively supply the refrigerant from the compressor to at least one of the first heat-exchanger, the second heat-exchanger, or the third heat-exchanger. In some examples, the first valve and the second valve are configured to control movement of the refrigerant or to expand the refrigerant introduced into the plurality of fluid lines.

In some implementations, the refrigerant circulation apparatus can further include a gas-liquid separator configured to separate a gaseous refrigerant or a liquid refrigerant from the refrigerant that is condensed or evaporated while passing through the at least one heat-exchanger. In some examples, the gas-liquid separator is connected to the compressor and the at least one heat-exchanger through the plurality of fluid lines.

In some examples, the at least one heat-exchanger, the at least one valve, and the gas-liquid separator are disposed at an outer surface of the second fluid line mounting plate. In some examples, an inner surface of the first fluid line mounting plate and an inner surface of the second fluid line mounting plate can face and contact each other to thereby define the plurality of fluid lines therebetween.

In some implementations, with the refrigerant circulating apparatus of a vehicle, which is included in an air conditioning system applied for cooling and heating of the vehicle interior of a purpose-built vehicle (PVB), it may be possible to reduce a manufacturing cost by minimizing use of piping while improving mountability of each constituent element.

In some examples, it may be possible to minimize heat loss that may occur while the refrigerant moves by minimizing the use of a pipe through which the refrigerant is circulated.

In some examples, it may be also possible to simplify a layout in a narrow space in the front of a vehicle, and improve mountability, assembling capability, and maintainability by promoting modularization of the refrigerant circulating apparatus.

In some examples, it may be possible to maximize an indoor space of a vehicle that can be applied for various purposes by mounting the refrigerant circulating apparatus modularized in a purpose-built vehicle (PBV) on a vehicle body.

DETAILED DESCRIPTION

One or more implementations will hereinafter be described in detail with reference to the accompanying drawings.

Figure 1:
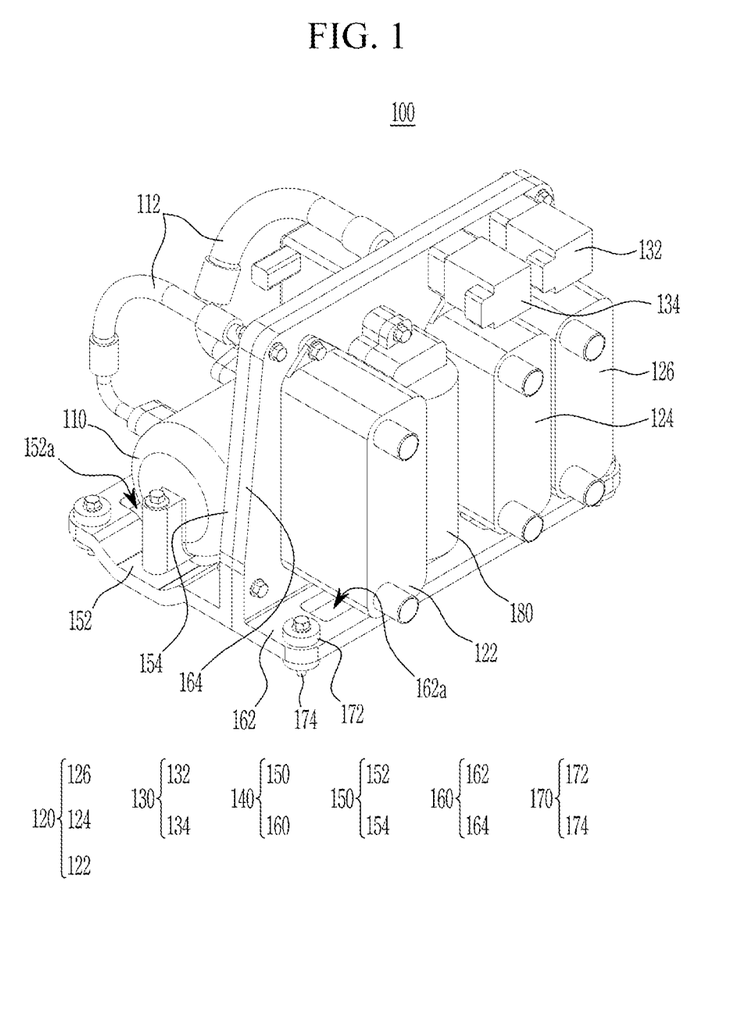
FIG. 1 is a perspective view showing an example of a refrigerant circulating apparatus of a vehicle.
Figure 2:
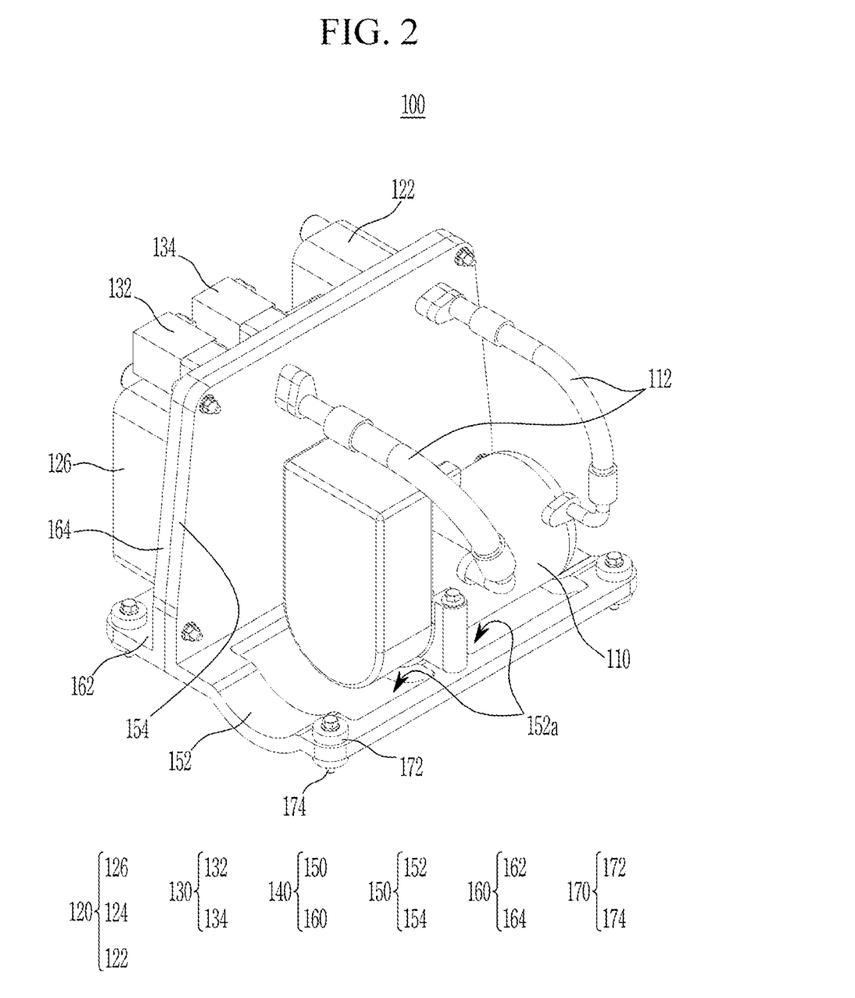
FIG. 2 is a perspective view showing the refrigerant circulating apparatus.
Figure 3:
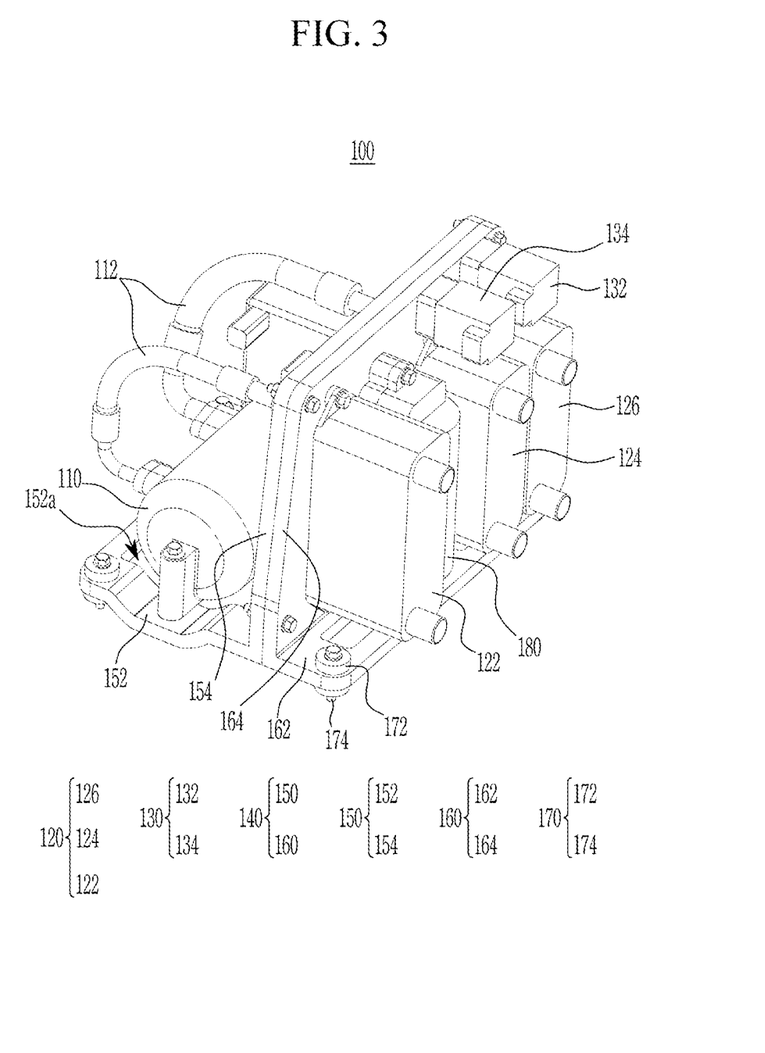
FIG. 3 is a perspective view showing the refrigerant circulating apparatus.
Figure 4:
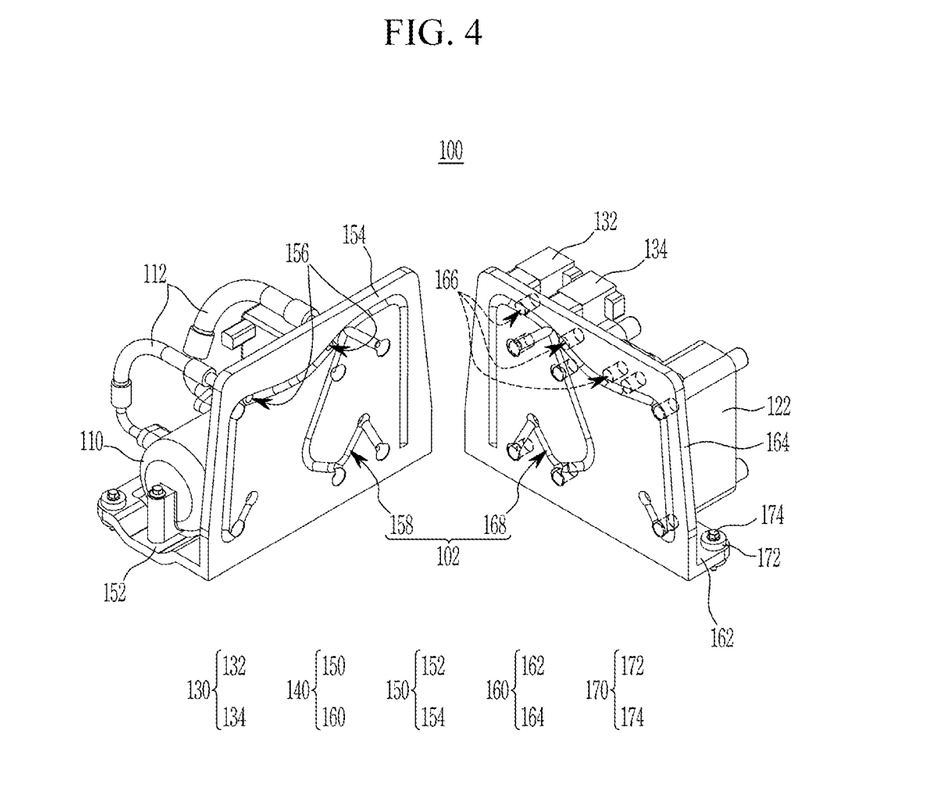
FIG. 4 is an exploded perspective view showing the refrigerant circulating apparatus.
Figure 5:
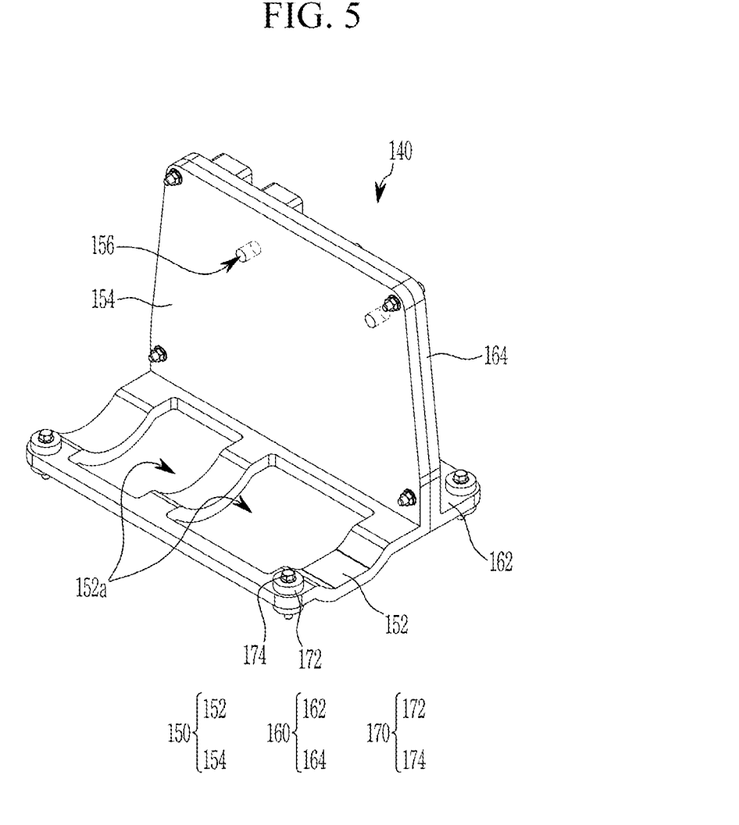
FIG. 5 is a perspective view showing an example of a refrigerant fluid line unit.
Figure 6:
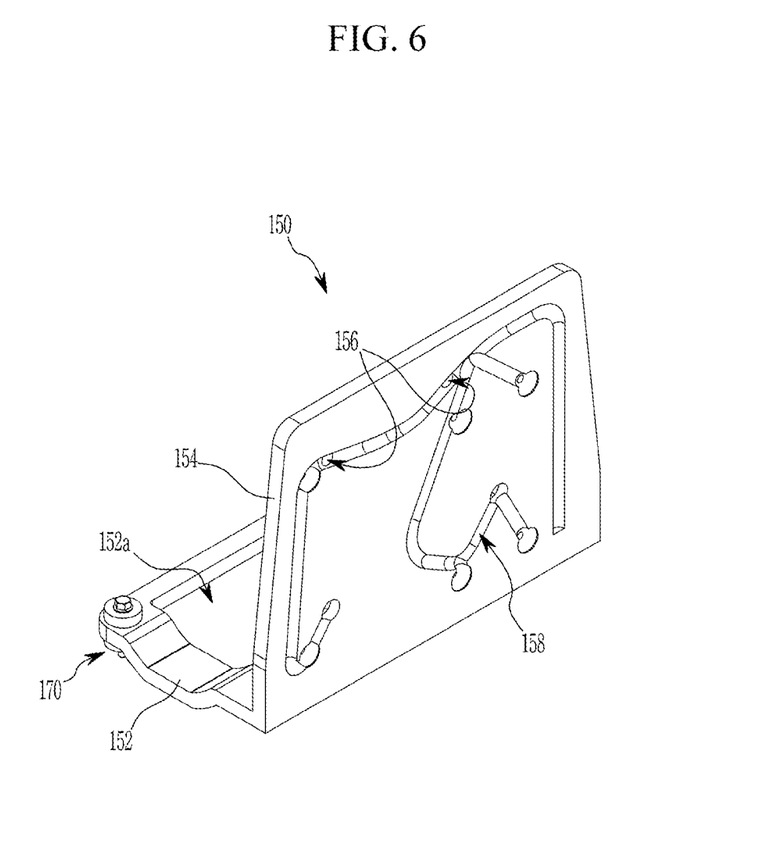
FIG. 6 is a perspective view showing an example of a first fluid line mounting plate.
Figure 7:
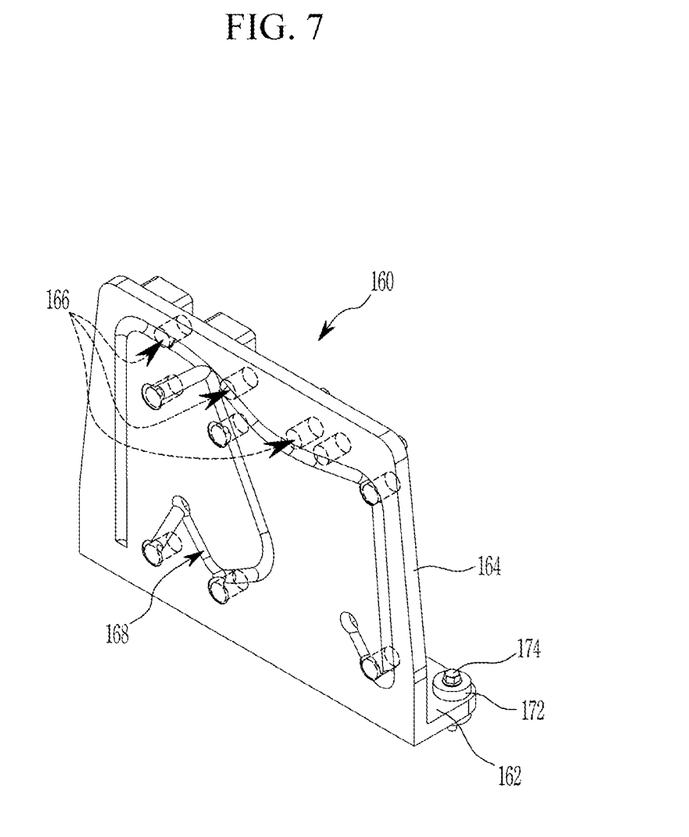
FIG. 7 is a perspective view showing an example of a second fluid line mounting plate.

FIG. 1 is a perspective view showing an example of a refrigerant circulating apparatus of a vehicle. FIG. 2 is a perspective view of the refrigerant circulating apparatus. FIG. 3 is a perspective view of the refrigerant circulating apparatus, viewed from still another angle. FIG. 4 is an exploded perspective view of the refrigerant circulating apparatus. FIG. 5 is a perspective view an example of a refrigerant fluid line unit. FIG. 6 is a perspective view showing an example of a first fluid line mounting plate. FIG. 7 is a perspective view showing an example of a second fluid line mounting plate.

In some implementations, the refrigerant circulating apparatus may be applied to, e.g., purpose-based mobility (purpose-built vehicle: hereinafter referred to as PBV).

The PBV is an electric vehicle-based eco-friendly mobile vehicle that provides customized services for passengers while they travel to their destination on the ground.

The PBV may be capable of setting an optimal path for each situation and performing platooning, and furthermore, may be a box-type design vehicle having a large interior space.

Such a PBV includes a skateboard-like rolling chassis (also referred to as an underbody in the art) and an upper body mounted on the rolling chassis.

A battery assembly may be mounted on the rolling chassis, and a driving motor may be installed.

In some implementations, referring to FIG. 1 to FIG. 7, a refrigerant circulating apparatus 100 of a vehicle can be provided in an air conditioning system applied for cooling and heating of the vehicle interior of the purpose-built vehicle (PBV), and configured to improve mountability of each constituent element and simultaneously, to reduce the manufacturing cost by minimizing use of piping.

In some implementations, a refrigerant circulation apparatus 100 can include a compressor 110, at least one heat-exchanger 120, at least one valve 130, and a refrigerant fluid line unit 140.

First, the compressor 110 may compress the introduced refrigerant. The at least one heat-exchanger 120 may heat-exchange the introduced refrigerant with coolant.

The at least one heat-exchanger 120 condenses or evaporates the refrigerant introduced therein through heat-exchange with a coolant.

That is, the at least one heat-exchanger 120 may be a water-cooled heat-exchanger for exchanging the introduced refrigerant with the coolant.

In some implementations, the at least one valve 130 may be provided to selectively flow the refrigerant through the at least one heat-exchanger 120. The at least one valve 130 may control a flow of the refrigerant or may selectively expand the introduced refrigerant.

The refrigerant fluid line unit 140 may be mounted in a vehicle body. The compressor 110, the at least one heat-exchanger 120, and the at least one valve 130 may be mounted in the refrigerant fluid line unit 140.

In addition, a plurality of fluid lines 102 may be formed in an interior of the refrigerant fluid line unit 140, so as to flow the refrigerant to the compressor 110 and the at least one heat-exchanger 120 by a selective operation of the at least one valve 130.

In some examples, the refrigerant fluid line unit 140 may include a first fluid line mounting plate 150 and a second fluid line mounting plate 160 coupled to each other.

The first fluid line mounting plate 150 includes a first bracket 152 and a first fluid line plate portion 154.

First, the first bracket 152 may be mounted on vehicle body. The compressor 110 may be seated and fixed on the first bracket 152.

In some examples, at least one first open hole 152a may be formed in the first bracket 152. The at least one first open hole 152a may be applied in order to the overall weight of the first fluid line mounting plate 150.

In addition, the first fluid line plate portion 154 may be bent from and integrally formed with the first bracket 152 such that the second fluid line mounting plate 160 may be coupled thereto.

That is, the first fluid line plate portion 154 is formed perpendicular to the first bracket 152 such that the first fluid line mounting plate 150 may be L-shaped.

The first fluid line plate portion 154 may include a plurality of first penetration holes 156 and a plurality of first grooves 158.

The plurality of first penetration holes 156 may be formed in the first fluid line plate portion 154 to supply the refrigerant to the compressor 110 or receive the refrigerant from the compressor 110.

That is, the compressor 110 is mounted on the first bracket 152, and may be connected to the first penetration hole 156 through a connecting member 112, on an outer surface of the first fluid line plate portion 154. The connecting member 112 may be formed as a hose or a pipe.

In addition, the first groove 158 may be provided in a plural quantity, selectively connected to the first penetration holes 156 on an inner surface of the first fluid line plate portion 154 facing the second fluid line mounting plate 160.

In some implementations, the second fluid line mounting plate 160 may include a second bracket 162 and a second fluid line plate portion 164.

First, the second bracket 162 may be mounted on vehicle body. In some examples, at least one second open hole 162a may be formed in the second bracket 162. The at least one second open hole 162a may be applied in order to the overall weight of the second fluid line mounting plate 160.

In addition, the second fluid line plate portion 164 may be bent from and integrally formed with the second bracket 162, to be coupled to the first fluid line plate portion 154.

That is, the second fluid line plate portion 164 is formed perpendicular to the second bracket 162 such that the second fluid line mounting plate 160 may be L-shaped.

In some examples, the second fluid line plate portion 164 may be formed in a shape similar to that of the first fluid line plate portion 154. In addition, the at least one heat-exchanger 120 and the at least one valve 130 may be mounted on an outer surface of the second fluid line plate portion 164.

In some examples, the second fluid line plate portion 164 may include a plurality of second penetration holes 166 and a plurality of second grooves 168.

First, the plurality of second penetration holes 166 may be formed on the second fluid line plate portion 164 to correspond to the at least one heat-exchanger 120 and the at least one valve 130.

Accordingly, the at least one heat-exchanger 120 and the at least one valve 130 may be mounted on the second fluid line plate portion 164 through the plurality of second penetration holes 166.

In addition, the plurality of second grooves 168 may be selectively connected to the second penetration holes 166 on an inner surface facing the first fluid line mounting plate 150.

In some implementations, the first grooves 158 and the second grooves 168 may be formed to have the same shape as each other.

In addition, the first grooves 158 and the second grooves 168 may form the plurality of fluid lines 102 to flow the refrigerant in a state that the first fluid line plate portion 154 and the second fluid line plate portion 164 are coupled to each other.

In some implementations, the at least one heat-exchanger 120 may include a first heat-exchanger 122, a second heat-exchanger 124, and a third heat-exchanger 126.

First, the first heat-exchanger 122 may condensate or evaporate the refrigerant selectively supplied through the fluid lines 102 from the compressor 110.

The second heat-exchanger 124 and the third heat-exchanger 126 may condensate or evaporate the refrigerant selectively supplied through the fluid lines 102 from the compressor 110 or the first heat-exchanger 122.

In some examples, the first heat-exchanger 122, the second heat-exchanger 124, and the third heat-exchanger 126 may be selectively supplied with the refrigerant from the fluid lines 102 by the operation of the at least one valve 130.

That is, the compressor 110, the first heat-exchanger 122, the second heat-exchanger 124, and the third heat-exchanger 126 may be interconnected through the fluid lines 102 according to the selective operation of the at least one valve 130.

The first heat-exchanger 122, the second heat-exchanger 124, and the third heat-exchanger 126 may be selectively supplied with the refrigerant from the compressor 110 by the at least one valve 130 operated depending on to a heating mode or a cooling mode of the vehicle.

As an example, when the refrigerant is supplied from the compressor 110 to the first heat-exchanger 122, the refrigerant having passed through the first heat-exchanger 122 may be introduced into the second heat-exchanger 124, or the third heat-exchanger 126.

In some implementations, the at least one valve 130 may include a first valve 132 and a second valve 134.

The first valve 132 and the second valve 134 may be connected between the compressor 110 and the first to third heat-exchangers 122, 124, and 126 through the fluid lines 102, so as to selectively inflow the refrigerant supplied from the compressor 110 to the first heat-exchanger 122, the second heat-exchanger 124, or the third heat-exchanger 126.

In some examples, the first valve 132 and the second valve 134 may control the flowing movement of the refrigerant, or selectively expand the introduced refrigerant.

That is, the first valve 132 and the second valve 134 may control flowing movement of the refrigerant introduced from the compressor 110 or the at least one heat-exchanger 12, and selectively expand the introduced refrigerant and flow the expanded refrigerant to the at least one heat-exchanger 120.

The first and second valves 132 and 134 may be mounted on the outer surface of the second fluid line plate portion 164.

In some implementations, at least one bush unit 170 may be provided to each of the first bracket 152 and the second bracket 162, so as to minimize transmission of vibration generated from the compressor 110, or the at least one heat-exchanger 120, or the at least one valve 130 to the vehicle body.

That is, the bush unit 170 may minimize the transmission of the vibration generated by the compressor 110 to the vehicle body frame through the first and second brackets 152 and 162.

The bush unit 170 may include an insulator 172 and a stud bolt 174.

First, an exterior circumference of the insulator 172 may be vulcanized and bonded to bush hole formed on each of the first bracket 152 and the second bracket 162. The insulator 172 may be formed in a bridge shape and a cylindrical shape having a through hole, its material may be formed of a rubber material.

In addition, an exterior circumference of the stud bolt 174 may be vulcanized and bonded to a center of the insulator 172, and fastened to the vehicle body frame.

Accordingly, when the vibration is generated from the compressor 110 in a vertical direction, the insulator 172 may absorb the vertical vibration of the compressor 110.

In addition, the rest of vibration other than the vibration in the vertical direction generated from the compressor 110 is transferred to the insulator 172 through the stud bolt 174, and may be efficiently insulated by using the elastic force of the insulator 172.

In some implementations, the stud bolt 174 is described to be vulcanized and bonded to the insulator 172 of the bush unit 170, but is not limited thereto.

That is, instead of the stud bolt 174, an inner ring capable of being bolted to the center of the bush unit 170 may be vulcanized and bonded to the insulator 172.

In some implementations, the refrigerant circulation apparatus 100 may further include a gas-liquid separator 180 configured to separate gaseous refrigerant or liquid refrigerant from the refrigerant condensed or evaporated while passing through the first heat-exchanger 122, or the second heat-exchanger 124, or the third heat-exchanger 126.

In some implementations, the gas-liquid separator 180 may be mounted on the outer surface of the second fluid line plate portion 164 between the first heat-exchanger 122 and the second heat-exchanger 124.

The refrigerant discharged flowing the first heat-exchanger 122, or the second heat-exchanger 124, or the third heat-exchanger 126 and introduced into the fluid line 102 may be from into the gas-liquid separator 180.

The gas-liquid separator 180 may be connected to the at least one valve 130 through the fluid lines 102, and connected to the compressor 110.

That is, the gas-liquid separator 180 may separate gaseous refrigerant and liquid refrigerant from the refrigerant having passed through the first heat-exchanger 122, or the second heat-exchanger 124, or the third heat-exchanger 126.

The gas-liquid separator 180 may supply the gaseous refrigerant among the refrigerant introduced from the first heat-exchanger 122, or the second heat-exchanger 124, or the third heat-exchanger 126 to the compressor 110.

Accordingly, the gas-liquid separator 180 may only supply the gaseous refrigerant to the compressor 110, thereby improving efficiency and durability of the compressor 110

Accordingly, when the refrigerant circulating apparatus of a vehicle configured as described above, which is included in an air conditioning system applied for cooling and heating of the vehicle interior of a purpose-built vehicle (PVB), is applied, it is possible to reduce a manufacturing cost by minimizing use of piping while improving mountability of each constituent element.

In addition, according to the present disclosure, it is possible to minimize heat loss that may occur while the refrigerant moves by minimizing the use of a pipe through which the refrigerant is circulated.

According to the present disclosure, it is also possible to simplify a layout in a narrow space in the front of a vehicle, and improve mountability, assembling capability, and maintainability by promoting modularization of the refrigerant circulating apparatus 100.

In addition, according to the present disclosure, it is possible to maximize an indoor space of a vehicle that can be applied for various purposes by mounting the refrigerant circulating apparatus 100 modularized in a purpose-built vehicle (PBV) on a vehicle body.

While this disclosure has been described in connection with what is presently considered to be practical implementations, it is to be understood that the disclosure is not limited to the disclosed implementations, but, on the contrary, is intended to cover various modifications and equivalent arrangements included within the spirit and scope of the appended claims.

What is claimed is:

1. A refrigerant circulating apparatus of a vehicle, comprising:
   a compressor configured to compress a refrigerant;
   at least one heat-exchanger configured to exchange heat with the refrigerant;
   at least one valve configured to selectively provide the refrigerant to the at least one heat-exchanger; and
   a refrigerant fluid line unit disposed adjacent to the compressor, the at least one heat-exchanger, and the at least one valve, the refrigerant fluid line unit comprising:
   a plurality of fluid lines that are defined inside the refrigerant fluid line unit and configured to provide the refrigerant to the compressor and the at least one heat-exchanger based on a selective operation of the at least one valve,
   a first fluid line mounting plate, and
   a second fluid line mounting plate coupled to the first fluid line mounting plate,
   wherein an inner surface of the first fluid line mounting plate and an inner surface of the second fluid line mounting plate face and contact each other to thereby define the plurality of fluid lines therebetween.

2. The refrigerant circulation apparatus of claim 1, wherein the first fluid line mounting plate comprises:
   a first bracket that supports the compressor; and
   a first fluid line plate portion that is curved from the first bracket and is coupled to the second fluid line mounting plate.

3. The refrigerant circulation apparatus of claim 2, wherein the first fluid line mounting plate has an L-shape, and
   wherein the first fluid line plate portion is disposed perpendicular to the first bracket.

4. The refrigerant circulation apparatus of claim 2, wherein the first fluid line plate portion defines:
- a plurality of first penetration holes configured to supply the refrigerant to the compressor and to receive the refrigerant from the compressor; and
- a plurality of first grooves defined at an inner surface of the first fluid line plate portion and connected to one or more of the plurality of first penetration holes, the inner surface of the first fluid line plate portion facing the second fluid line mounting plate.

5. The refrigerant circulation apparatus of claim 4, wherein the second fluid line mounting plate comprises:
- a second bracket; and
- a second fluid line plate portion that is curved from the second bracket and is coupled to the first fluid line plate portion, and
- wherein the at least one heat-exchanger and the at least one valve are disposed at an outer surface of the second fluid line plate portion.

6. The refrigerant circulation apparatus of claim 5, wherein the second fluid line mounting plate has an L-shape, and
- wherein the second fluid line plate portion is disposed perpendicular to the second bracket.

7. The refrigerant circulation apparatus of claim 5, wherein the second fluid line plate portion defines:
- a plurality of second penetration holes configured to communicate with the at least one heat-exchanger and the at least one valve; and
- a plurality of second grooves defined at an inner surface of the second fluid line plate portion and connected to one or more of the plurality of second penetration holes, the inner surface of the second fluid line plate portion facing the first fluid line plate portion.

8. The refrigerant circulation apparatus of claim 7, wherein shapes of the plurality of first grooves are identical to shapes of the plurality of second grooves, respectively.

9. The refrigerant circulation apparatus of claim 7, wherein the plurality of first grooves are coupled to the plurality of second grooves, respectively, to thereby define the plurality of fluid lines in a state in which the first fluid line plate portion and the second fluid line plate portion are coupled to each other.

10. The refrigerant circulation apparatus of claim 5, further comprising:
- at least one bush unit disposed at least one of the first bracket or the second bracket and configured to reduce transmission of vibration generated from the compressor, the at least one heat-exchanger, or the at least one valve.

11. The refrigerant circulation apparatus of claim 10, wherein the at least one bush unit comprises:
- an insulator coupled to the first bracket or the second bracket; and
- a stud bolt coupled to in a center of the insulator.

12. The refrigerant circulation apparatus of claim 5, wherein the first bracket defines at least one first open hole, and
- wherein the second bracket defines at least one second open hole.

13. The refrigerant circulation apparatus of claim 1, wherein the at least one heat-exchanger is configured to configured to exchange heat between a coolant and the refrigerant in the plurality of fluid lines to thereby condensate or evaporate the refrigerant.

14. The refrigerant circulation apparatus of claim 1, wherein the at least one heat-exchanger comprises:
- a first heat-exchanger configured to condensate or evaporate the refrigerant supplied through the plurality of fluid lines;
- a second heat-exchanger configured to condensate or evaporate the refrigerant supplied through the plurality of fluid lines from the compressor or the first heat-exchanger; and
- a third heat-exchanger configured to condensate or evaporate the refrigerant supplied through the plurality of fluid lines from the compressor or the first heat-exchanger.

15. The refrigerant circulation apparatus of claim 14, wherein the at least one valve comprises a first valve and a second valve that are connected to the compressor and to the first to third heat-exchangers via the plurality of fluid lines, and
- wherein the first valve and the second valve are configured to selectively supply the refrigerant from the compressor to at least one of the first heat-exchanger, the second heat-exchanger, or the third heat-exchanger.

16. The refrigerant circulation apparatus of claim 15, wherein the first valve and the second valve are configured to control movement of the refrigerant or to expand the refrigerant introduced into the plurality of fluid lines.

17. The refrigerant circulation apparatus of claim 1, further comprising a gas-liquid separator configured to separate a gaseous refrigerant or a liquid refrigerant from the refrigerant that is condensed or evaporated while passing through the at least one heat-exchanger.

18. The refrigerant circulation apparatus of claim 17, wherein the gas-liquid separator is connected to the compressor and the at least one heat-exchanger through the plurality of fluid lines.

19. The refrigerant circulation apparatus of claim 17, wherein the at least one heat-exchanger, the at least one valve, and the gas-liquid separator are disposed at an outer surface of the second fluid line mounting plate.

20. A refrigerant circulating apparatus of a vehicle, comprising:
- a compressor configured to compress a refrigerant;
- at least one heat-exchanger configured to exchange heat with the refrigerant;
- at least one valve configured to selectively provide the refrigerant to the at least one heat-exchanger; and
- a refrigerant fluid line unit disposed adjacent to the compressor, the at least one heat-exchanger, and the at least one valve, the refrigerant fluid line unit comprising:
  - a plurality of fluid lines that are defined inside the refrigerant fluid line unit and configured to provide the refrigerant to the compressor and the at least one heat-exchanger based on a selective operation of the at least one valve,
  - a first fluid line mounting plate, and
  - a second fluid line mounting plate coupled to the first fluid line mounting plate, and
- wherein the first fluid line mounting plate comprises:
  - a first bracket that supports the compressor; and
  - a first fluid line plate portion that is curved from the first bracket and is coupled to the second fluid line mounting plate.

* * * * *